T. LANGSTON.
Lantern.
No. 98,602.
Patented Jan. 4, 1870.
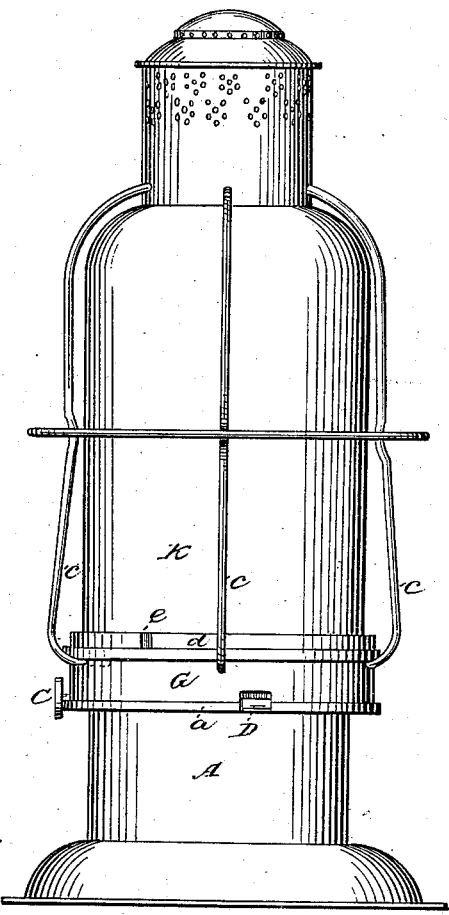
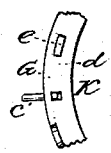
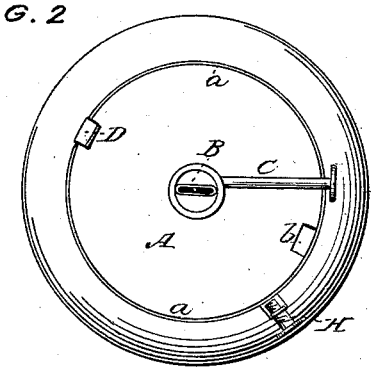
WITNESSES:
INVENTOR:

United States Patent Office.

THOMAS LANGSTON, OF MERIDEN, CONNECTICUT.

Letters Patent No. 98,602, dated January 4, 1870.

IMPROVEMENT IN LANTERNS.

The Schedule referred to in these Letters Patent and making part of the same.

*To all whom it may concern:*

Be it known that I, THOMAS LANGSTON, of Meriden, in the county of New-Haven, and in the State of Connecticut, have invented certain new and useful Improvements in Lanterns; and do hereby declare that the following is a full, clear, and exact description thereof, reference being had to the accompanying drawings, and to the letters of reference marked thereon, making a part of this specification.

The nature of my invention consists in the construction of a lantern, the base of which is so formed as to make a lamp, and in the manner of holding the glass within the guard, as will be hereafter more fully set forth and explained.

Figure 1 is a side elevation of my invention.

Figure 2 is a plan view of the base or lamp.

Figure 3 is a bottom view of the guard-rim and glass, showing the manner of holding the glass in place.

Letter A represents the base of the lantern, which has a flange, *a*, formed around its top, extending upward, so as to keep the guard-rim in place, and which is provided with a burner, B, the wick-raiser of which has a stem, C, attached to it, sufficiently long to extend out through the flange *a*, so that the wick can be raised and lowered without removing the top.

Through one side of the top of the base there is an air-hole, *b*, and on the opposite side there is a lug, D, extending over the flange *a*, which passing through an opening in the side of the guard-rim G, together with the screw H, holds the rim securely in place. This base forms a lamp.

One of the guard-wires *c* has its end made to extend a short distance through the rim G, upon which the glass globe or chimney K is supported and held in place.

Around the bottom of the glass there is a flange, *d*, formed, through which a slot or opening, *e*, is made, as seen in fig. 3, so that the projecting end of the guard-wire can pass through it, when the glass is turned partly around, and is thus supported in place.

Having thus described my invention,

What I claim, and desire to secure by Letters Patent, is—

1. The base A, provided with a burner, B, screw H, lug D, flange *a*, and air-hole *b*, substantially in the manner specified.

2. Providing the glass K with a flange, *d*, around its bottom, through which the slot *e* is cut, substantially in the manner shown.

3. The wire *c*, extending through the rim G, so as to support the glass, substantially in the manner set forth.

4. The base A, burner B, stem C, lug D, flange *a*, air-hole *b*, screw H, rim G, guard *c* extending through the rim, and glass K, with its flange and slot, when all are arranged and combined so as to form a lantern, substantially as specified.

In testimony that I claim the foregoing, I have hereunto set my hand, this 11th day of November, 1869.

THOMAS LANGSTON.

Witnesses:
E. C. BIRDSEY,
ELISHA B. ELDERKIN.